United States Patent Office 2,752,300
Patented June 26, 1956

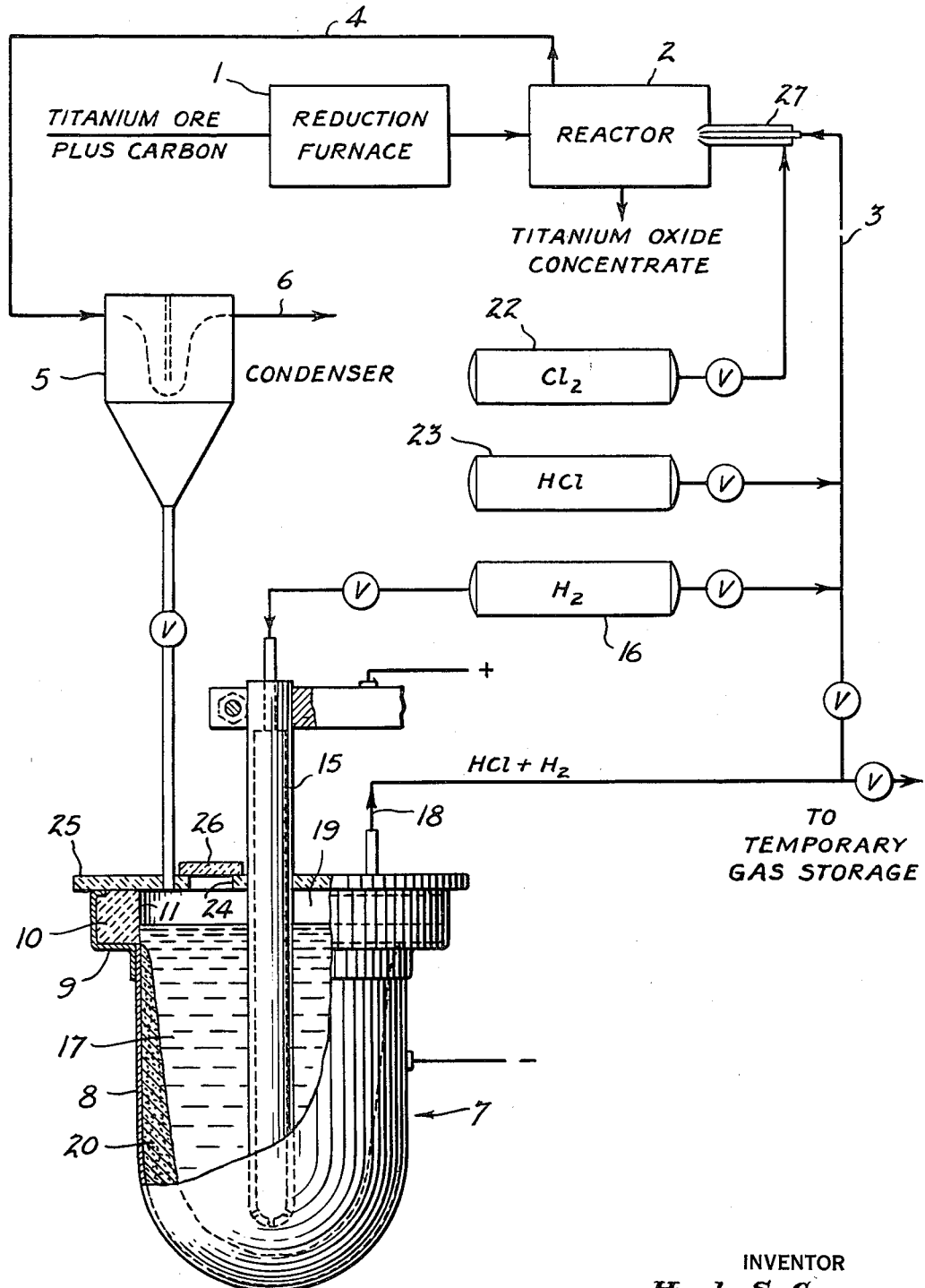

2,752,300

BENEFICIATING TITANIUM OXIDE ORES

Hugh S. Cooper, Shaker Heights, Ohio, assignor to Walter M. Weil, Cleveland, Ohio Application May 4, 1953, Serial No. 352,826

6 Claims. (Cl. 204—10)

This invention relates to the production of titanium oxide concentrates from titanium ores and particularly to the removal of iron from such ores to produce a substantially iron-free titanium dioxide concentrate suitable for chlorination to produce substantially pure titanium tetrachloride. The invention involves improvements in prior art processes in which the iron in the ores is chloridized and removed as an iron chloride sublimate.

The chloridizing reactions first proposed by the prior art were carried out by heating a suitable ore, such as ilmenite, in a reactor and intimately contacting the hot ore with chlorine or phosgene to convert the iron, considered to be present in the form of ferrous titanate (FeTiO₃), to ferric chloride. One objection to such processes is the difficulty of regenerating or recovering the chlorine or phosgene for reuse in the process, which is essential to economical operation. Also, the reaction is undesirably slow when chlorine is employed, and phosgene is so highly active that it also chloridizes a large proportion of the titanium, which vaporizes as titanium chloride along with the ferric chloride and is lost from the final product unless recovered free from iron by a difficult separation of these vaporized chlorides by fractional condensation.

U. S. Patent No. 1,528,319 to Carteret et al. for Process for the Preparation of Oxygenated Compounds of Titanium and Pigments Containing Said Compounds, discloses a variation of the earlier processes in which the ore is first heated in admixture with carbon or in the presence of a reducing gas to a temperature of about 800° C. for one or two hours, presumably to reduce the iron in the ore either partially or wholly to the metallic state. Thereafter, the product of the reduction operation is treated with chlorine, first at about 350° C. for the stated purpose of removing the iron as iron chloride, and then at 550–600° C. for removing the titanium as titanium chloride. However, efforts to duplicate the process have failed in several respects insofar as any practical results are concerned. First, no reduction of the iron oxide component with carbon was obtainable under the conditions described by Carteret et al., the carbon remaining unused and chloridization of the resulting mass with chlorine under the conditions described by Carteret et al. resulted in the evolution of less than 1% of the iron (as FeCl₃). Second, reduction of the iron with hydrogen (the only reducing gas mentioned) and subsequent chloridization with chlorine under the conditions described by Carteret et al. was impractically slow, the iron removal was not sufficiently complete to render the residue useful for producing titanium tetrachloride as a raw material for the titanium metal industry, and the cost of the process was so great as to be non-competitive with other processes.

U. S. Patent 2,183,365 to James E. Booge for Preparation of Titanium Concentrates discloses still another variation of the earlier processes in which the ore is first oxidized by heating it in contact with air to convert the iron substantially completely to the ferric state. The oxidized ore is then contacted with so-called "dry hydrogen chloride gas" to form ferric chloride which is sublimed and removed as it forms, leaving a titanium oxide residue containing, as stated by Booge, "not exceeding substantially 5% and usually less than 2%" of iron oxide. Booge suggested that the ferric chloride sublimate be reacted with steam at elevated temperatures to produce iron oxide and hydrogen chloride, this hydrogen chloride then being dried and used, along with the unreacted excess hydrogen chloride gas passing through the ferric chloride condenser, to chloridize additional ore. By this process, Booge obtained relatively rapid and selective chloridization of only the iron in the titanium ore and some economy, in theory at least, resulting from the regeneration of HCl from the ferric chloride byproduct. However, the iron oxide by-product is of little value and the difficulty and expense of converting the recovered aqueous hydrochloric acid to dry hydrogen chloride renders this method of recovering the chloridizing reagent commercially impractical. Also, the degree of iron removal, leaving around 2% iron in the titanium dioxide product is far from satisfactory.

A number of other variations of the treatment of ilmenite with a chloridizing reagent to selectively sublime the iron as iron chloride have been proposed, but, as far as I am aware, all have met with indifferent success. Either the iron removal has been too incomplete, or excessive amounts of titanium have been removed with the iron and lost, or the processes have been so very slow as to render them commercially impractical, or the costs have been excessive for one reason or another.

The principal object of the present invention is to provide a more economical and efficient process for removing iron from titanium ores than those heretofore proposed.

Another object of the invention is to provide a cyclic process for chloridizing titanium ores to remove iron in such a manner that a more valuable iron by-product results and the chloridizing agent employed is largely recovered in an anhydrous form that requires no dehydration or other costly processing before being recycled for treating additional ore.

The invention involves a preliminary reduction step for converting substantially all of the iron oxide component of the ore to metallic iron while altering the physical character of the mass to render it more pervious to a chloridizing gas and more easily handled, followed by a chloridizing step in which substantially all of the iron is converted to FeCl₂ and sublimed to leave a substantially iron-free titanium dioxide concentrate. The invention further involves condensing the sublimed FeCl₂ in anhydrous form and electrolyzing it in a fused salt bath to produce a substantially pure metallic iron powder as a by-product and to release anhydrous HCl for reuse in chloridizing additional ore. As a result of the combination of operations, the purity of the titanium dioxide product is improved so that it may be directly chloridized to produce a substantially pure titanium tetrachloride suitable for subsequent use in the manufacture of titanium metal of high quality. As a further result, the combination of operations yields a powdered iron of sufficient commercial value to defray the major proportion of the cost of producing the iron-free titanium dioxide, which cost is held low by the facts that the iron in the iron chloride is in the ferrous condition requiring a minimum amount of power for reduction and the electrolysis step also regenerates the major proportion of the chloridizing reagent in an anhydrous form suitable for reuse in the treatment of additional ore, without purification or other costly processing.

The preliminary reduction operation is characterized by the heating of the ore with carbon at a temperature in the range of about 1100 to 1450° C., preferably 1250 to 1400° C., without the use of any flux, whereby substantially all of the iron oxide is reduced to metallic iron, the titanium dioxide remains unreduced, and the ore is converted to a well sintered, coherent, porous mass that is easily handled and is readily and thoroughly penetrated by a chloridizing gas.

The chloridizing operation is characterized by subjecting the sintered mass from the reduction operation to a stream of dry HCl gas at a temperature in the range of about 750 to 1000° C. to convert the iron to ferrous chloride, without forming water vapor, and to sublime it from the mass in anhydrous form, leaving a substantially iron-free titanium dioxide residue. By condensing the ferrous chloride sublimate under anhyrous conditions, it is recovered in a form suitable for direct use in the fused bath electrolysis operation.

The fused bath electrolysis operation is characterized by the employment of a fused salt bath consisting essentially of alkali metal chloride and the ferrous chloride to be electrolyzed; by the introduction of hydrogen gas into the fused bath during electrolysis to react the chlorine released at the anode and produce anhydrous HCl above the bath for collection and reuse; and by the employment of an electrolytic cell in which a closed metal pot constitutes the cathode and has an upper, inner, non-metallic surface about its entire periphery that is inert to the contents of the pot, the surface of the bath being maintained above the lower edge of and entirely surounded by said non-metallic surface throughout the electrolysis operation. The fused bath electrolysis operation is the subject of my co-pending applications Serial No. 214,988, filed March 10, 1951 (abandoned), and Serial No. 453,898, filed September 2, 1954.

By the combination of these operations, the entire process may be carried out with high efficiency and economy rendering it capable of practical commercial use on a large scale in the production of iron-free titanium dioxide for the titanium metal industry, whereas prior processes involving generally similar chloridizing operations have been wholly impractical for commercial purposes and incapable of competing with entirely different processes currently in commercial use.

In commercial scale apparatus, the anhydrous hydrogen chloride is efficiently utilized in the cloridizing reactor so that only a small excess passes to the condenser in admixture with the ferrous chloride sublimate. The condenser temperature is such that, in the presence of the excess hydrogen chloride in the gases passing through the condenser, any minute amount of water that may get into the system passes through the condenser and out of the system together with the excess hydrogen chloride. While this unreacted hydrogen chloride, which may contain traces of water, can be recovered and dried for reuse in the reactor, the amounts recoverable in this way may or may not justify doing so. The hydrogen chloride entering into the chloridizing reaction is regenerated in a completely anhydrous form in the electrolysis operation and is readily recovered, generally in admixture with excess hydrogen from the electrolytic cell. By adding to the recovered gas mixture an amount of chlorine equivalent to the excess hydrogen, additional HCl is formed so that little if any make-up HCl need to be added as such after the process has been placed in operation around the entire cycle. This combination of hydrogen and chlorine is exothermic, and the heat of reaction may be utilized in the chloridizing reactor by combining the two gases at that point.

Hydrogen chloride containing less than 1% water, and preferably less than 0.1 or 0.2% or so, such as is obtained by direct combination of dry hydrogen and dry chlorine, is the ideal reagent. The presence of larger amounts of water slows down the reaction and makes it more difficult to recover a substantially anhydrous ferrous chloride from the condenser, which is essential to successful electrolysis of the ferrous chloride.

The ore available in largest supply and most suitable for treatment in accordance with the present invention is ilmenite. However, it will be understood that any material containing iron oxide and titanium dioxide, either in admixture or in the form of iron-titanium complexes, may be advantageously concentrated by the same treatment. Thus, while the invention is illustrated herein by reference particularly to ilmenite as a raw material, the scope of the invention is not limited to the treatment of this particular ore. For convenience, in the appended claims, the expression iron oxide-titanium dioxide ores is used to designate all raw materials containing the essential constituents of ilmenite in substantial proportion.

The foregoing and still further objects, features, and advantages of the invention will be better understood from the following detailed description of the process and the preferred system and apparatus for carrying out the process, and from the accompanying drawing in which a flow diagram for the system and certain preferred details of an electrolytic cell for use therein are shown.

In the accompanying flow diagram a reduction furnace 1 of any suitable design may be employed for roasting a finely divided mixture of the ore with carbon at a temperature in the range of about 1100 to 1450° C., below the fusion temperature of the ore constituents, while excluding air. Preferably a soure (not shown) of an inert or a reducing gas is connected to the furnace for scavenging out the air before heating the charge.

After reduction of the iron oxide component of the ore to metallic iron in the furnace 1, the ore is in a highly porous, coherent mass, which is readily broken up into lumps and transferred from the furnace 1 to a reactor 2 of any suitable design for passing a stream of chloridizing gas through the lumps of porous, partially reduced ore while heating the charge and holding it at a temperature in the range of about 600 to 1000° C. The reactor has a supply conduit 3 connected thereto for introducing a chloridizing gas and an exhaust conduit 4 for withdrawing the iron chloride sublimate from the chloridizing operation, along with excess chloridizing gas.

The sublimate gases from the reactor 2 are drawn off from the reactor as they accumulate and are conducted through the conduit 4 to a condenser 5, where the iron chloride is condensed, preferably at a temperature in the range of about 350° to 650° C. while permitting the excess chloridizing gas and any traces of water vapor to pass through the condenser, as indicated by the arrow 6, to the atmosphere or to any suitable recovery system (not shown). Conventional means (not shown) may be provided for maintaining the condenser temperature in the preferred range of about 350 to 650° C.

The condensed iron chloride may be temporarily stored out of contact with air and moisture for later electrolysis, or it may be transferred directly into a molten bath of alkali metal chloride in an electrolytic cell 7 for electrolytic reduction.

The electrolytic cell is preferably of the character which I first disclosed in my copending application Serial No. 201,089, filed December 16, 1950, for Methods of and Apparatus for Making Chromium (a continuation-in-part of an earlier application Serial No. 144,410, filed February 16, 1950), and which is also disclosed in my abovementioned applications Serial No. 214,988, filed March 10, 1951 (abandoned) and Serial No. 453,898, filed September 2, 1954. In such a cell, a covered pot 8 of Inconel or other heat resistant alloy forms the cathode, the upper portion of the pot being offset outwardly at 9 to accommodate a suitable refractory 10. An electrically non-conductive, highly inert magnesia is a preferred refractory for this purpose. It may be mixed with water to form a suitable ramming mix, rammed in place, and dried to provide an inert, electrically non-conductive surface 11 inside the pot extending a substantial distance down from the upper edge thereof entirely about its periphery.

The anode is a hollow rod or tube 15, preferably of graphite, that extends downwardly into the bath to adjacent the bottom of the pot so that it may also serve as a conduit for conducting hydrogen gas into the pot from a source 16 and discharging it into the bath 17 adjacent the bottom thereof and preferably in a downward direction. The hydrogen so discharged from the anode is dispersed and diffused throughout the bath, and particularly around the anode, for reaction with chlorine released from the anode during electrolysis of the iron chloride. Hydrogen chloride resulting from reaction of hydrogen and chlorine in the cell, together with the excess hydrogen preferably supplied, accumulate in the cell above the bath and are withdrawn through a conduit 18 for temporary storage or for immediate reuse as described below.

The iron chloride to be electrolyzed dissolves quickly in the bath 17 without fuming or foaming, and electrolysis is then carried out while continuing the flow of hydrogen into the bath from the anode 15. During electrolysis the iron chloride is disassociated, the iron being deposited in a fine granular or powder form on the cathode walls of the pot, as shown at 20, and chlorine being released at the anode 15 where it is quickly converted to HCl by reaction with the hydrogen with which the bath is kept continuously saturated and which is preferably present in excess. The rapid conversion of the released chlorine to HCl prevents reoxidation of the deposited iron back to iron chloride and reduces the attack on the metal of the pot which would tend to introduce other metal chlorides into the bath as impurities. The hydrogen apparently also assists in the reduction of the iron chloride by chemical action while agitating the entire bath to maintain uniformity of its composition. The bath level is maintained above the lower edge of the refractory surface 11 throughout the process.

The foregoing electrolytic process and apparatus permit the bath 17 to be exhausted of ferrous chloride and retard the formation of contaminants so that substantially no oxidizable chlorides or other impurities are entrained with the deposited iron powder when it is recovered from the cell. As a result, the deposited iron powder may be recovered with close to theoretical yields and with a purity better than 99% merely by decanting off the bath for reuse, scraping the deposited iron powder from the walls of the pot, and washing the iron powder with water to remove the soluble alkali chlorides entrained therewith.

The HCl withdrawn from above the bath 17 through the conduit 18, together with the excess hydrogen preferably present, may be temporarily stored or delivered directly to the chloridizing reactor through the conduit 2, preferably while adding only sufficient make-up chlorine from a source 22 to convert the excess hydrogen to HCl as the gases are introduced into the reactor. A source 23 of anhydrous HCl may also be connected to the conduit if desired, to supply HCl as the chloridizing gas at the beginning of the process and any make-up required during the process. Alternatively, as noted below, chlorine from the source 22 may be employed as the chloridizing gas when first placing the system in operation.

By the simple and convenient expedient of providing standby condensers and electrolytic cells for connection into the system interchangeably with the condenser and electrolytic cell operating at any given time, and by feeding the partially reduced ore and chloridizing gases continuously through the reactor 1, in counter-current fashion, the process may be made substantially continuous if desired.

The composition of ilmenite ores varies widely according to source, and a typical composition cannot be given. However, an average analysis of so-called "high grade" ores might run about as follows:

| | Percent by Weight |
|---|---|
| $TiO_2$ | 52 |
| $FeO$ | 30 |
| $Fe_2O_3$ | 10 |
| $SiO_2$ | 2 |
| $Al_2O_3$ | 1 |
| $MgO$ | 1 |
| Balance | 4 |

The unnamed balance generally includes $CaO$, $P_2O_5$, $MnO$, $V_2O_5$, $Cr_2O_3$, $SnO_2$, and $ZrO_2$, and may include unimportant traces of a number of other compounds and elements. For the purposes of the present invention, the variations in composition are relatively unimportant, however. Since the majority of the commercial ores are derived from beach sands, they are normally in granular form as received.

In accordance with the preferred procedure for carrying out the invention, the particle size of the ore is reduced, if necessary, so that the bulk of it will pass through a 30° mesh screen. A measured quantity of carbon in finely divided form, such as lamp black, is then thoroughly mixed with the ore, the quantity being that theoretically required to combine with all of the oxygen of the ferrous and ferric oxides to form CO, with a slight deficiency, rather than an excess, being preferred to avoid leaving free carbon in the partially reduced ore. The mixture of ore and carbon is then charged to the furnace 1. While preventing the entrance of additional air so as to create a reducing atmosphere, the furnace is then heated to bring the temperature of the charge into the range of 1100 to 1450° C., where it is held for three to four hours, depending upon the particular temperature employed and the physical character of the ore-carbon mixture. Within the specified temperature range, and most efficiently above 1200° C., the amount of carbon specified is sufficient to substantially completely reduce the iron oxide to metallic iron without reducing the titanium dioxide or any of the other principal constituents of the ore and without leaving free carbon in the partially reduced ore. At the same time, and of equal importance to efficiency of the process, the ore sinters into a highly porous, coherent mass which when broken into lumps, is ideally suited for treatment in the chloridizing operation that follows.

When the reduction operation has been performed, the partially reduced ore is allowed to cool, is broken up into lumps preferably of the order of 1 to 3 or 4 inches in diameter, and is transferred into the reactor 2. With the reactor closed to the atmosphere, it is purged of air in any desired manner, as by passing a stream of dry chlorine or dry HCl from the source 22 or 23 through the ore mass in the reactor. The scavenging gas is preferably also passed on from the reactor through the conduit 4 and the condenser 5 for the same purpose. While continuing the flow of one or the other of the suggested scavenging gases, or a mixture thereof, the charge in the reactor is heated to a temperature in the range of about 600 to 1000° C., depending on the particular gas or gases employed, whereby the same gas or gases begin to chloridize the iron in the ore. When chlorine is used as the chloridizing agent, rapid chloridization of the iron will take place at about 600° C., though a temperature of 700 to 800° C. is preferred and still higher temperatures may be used. When dry hydrogen chloride is the chloridizing agent, rapid reaction requires somewhat higher temperatures, 800 to 900° C. being preferred and temperatures up to 1000° C. being suitable.

Dry HCl is the preferred chloridizing agent because it reacts with both iron oxide and metallic iron to produce ferrous chloride, whereas chlorine produces ferric chloride in both cases. Whichever chloridizing agent is used, the reduction of the iron to metallic form accelerates the chloridizing operation and increases the completeness and selectiveness of the operation. This is particularly so when the iron reduction is carried out as herein described to give the ore the highly porous, coherent structure prior to chloridizing.

To the extent that any ferrous oxide is left unreduced during the reduction operation, chloridization with dry HCl proceeds according to the formula:

$$FeO + 2HCl \rightarrow FeCl_2 + H_2O$$

However, since practically complete reduction of the iron to the metallic state is readily achieved in the furnace 1, the chloridization proceeds almost entirely according to the formula $$Fe + 2HCl \rightarrow FeCl_2 + H_2$$

Thus, only traces of water vapor are present in the sublimate, which makes it possible to condense the $FeCl_2$ in substantially a completely anhydrous form. The great affinity of the excess HCl for such water vapor and the use of a condenser temperature preferably in the range of 350 to 650° C. cause any small amounts of water to pass out of the condenser through the conduit 6 with the excess HCl.

While chlorine is a more active chloridizing agent than HCl and can be employed at lower temperatures as indicated, more power is required to reduce the resulting $FeCl_3$ in the electrolytic cell 7, and use of chlorine as the chloridizing reagent is undesirable for this reason. Moreover, the gases withdrawn from the electrolytic cell consist of HCl plus the excess hydrogen preferably introduced into the system from the source 16, and these gases are available in considerable volume for use in the reactor 1. Accordingly, the economy of the process, which renders it so desirable for commercial use, is dependent upon use of this HCl as the principal chloridizing reagent, as described in more detail hereinafter.

However, I do not wish to preclude the use of chlorine alone, or in admixture with HCl, when first placing the process in operation. The chlorine so used is largely recovered again from the electrolytic cell as HCl for reuse in chloridizing subsequent batches of ore, so that the initial use of chlorine or a mixture of chlorine and HCl may be desirable. In fact, the process can be readily regulated as hereinafter described so that the preferred dry HCl for treating subsequent batches of ore is produced in the system while processing one or more initial batches of ore entirely with chlorine, thus making it unnecessary to employ any other source of dry HCl.

Whether HCl alone, chlorine alone, or a mixture of the two anhydrous gases is employed for chloridizing a particular batch of partially reduced ore, the iron content of the ore may readily be substantially completely removed in three or four hours or so, depending upon the particular chloridizing temperature employed, the rate of flow of the chloridizing gas, the percentage of iron in the ore, the completeness of its prereduction to metallic form, and other factors subject to numerous obvious variations. Repeated experiments with a variety of ores have demonstrated that the iron in the residue following chloridization may be kept consistently below 0.5% and generally below 0.2% by weight.

The substantially iron-free titanium dioxide concentrate remaining in the reactor is a light tan in color and retains the highly porous, coherent structure resulting from the partial reduction with carbon in the specified temperature range. Therefore, it is in an ideal form for further chloridization at higher temperatures or with more active chloridizing reagents, such as phosgene. Such further chloridization may, of course, be performed in the same reactor, if desired. On the other hand, it is so highly friable that it is readily broken up to the extent necessary for convenient removal from the reactor, and may be stored or transported elsewhere for use as a starting material in producing $TiCl_4$ for the titanium metal industry.

As noted above, by maintaining the condenser 4 at a temperature in the range of 350 to 650° C., the iron chloride sublimate from the reactor 1 may readily be condensed to an anhydrous powder suitable for direct introduction into the electrolytic cell 7. To insure maintenance of its anhydrous condition during such temporary storage as may be necessary, it should be stored in air tight containers. Preferably, the anhydrous iron chloride is fed directly from the condenser to an electrolytic cell as shown in the drawing.

In accordance with my above mentioned copending applications, Serial No. 214,988 (abandoned), and Serial No. 453,898, pure, anhydrous, alkali metal chloride is melted in the pot 8 and brought to a temperature at which it is nicely fluid. The cover of the cell, is also preferably made of a non-metallic refractory material that is chemically inert to the contents of the pot during the process, such as soapstone. This cover is preferably kept in place while preparing the fused bath to keep out atmospheric moisture.

The composition of the bath is preferably about equal parts of sodium and potassium chlorides, which mixture melts at a lower temperature than either of the chlorides alone and is suitably fluid at 800° C. Either chloride alone may be used at somewhat higher temperatures, but this increases the opportunities for contamination of the metal product and, of course, increases the cost of the operation both as regards the heat input required and the life of the equipment.

When the alkali metal chloride bath has been prepared, the anode 15 is inserted and a stream of hydrogen gas from the source 16 is fed into the cell through the anode 15 and the bath 17 to purge all air from the space above the bath. During this step, the air and hydrogen passing out through the conduit 18 are conducted out of the system. At the same time, a voltage of about 6 volts is applied across the terminals of the cell to drive off any moisture that might still be in the bath. Iron chloride to be electrolyzed is then fed into the cell in portions of about 2 to 5% by weight of the bath every five minutes, until around 15% has been added. Additional iron chloride is fed into the cell from time to time during electrolysis to replace that consumed and maintain some iron chloride in the bath at all times until the end of the run. The stream of hydrogen gas is continued throughout the run, and, as soon as HCl is detected in the conduit 18 after charging the cell with iron chloride, the gases withdrawn from the cell are routed into the conduit 3 or are sent to temporary storage. Care should be taken to keep the bath level at all times above the lower edge of the refractory surface 11 so that the gases in the cell above the bath are never in contact with any part of the metal pot 8 and are completely enclosed above the bath by this surface and the chemically inert cover of the pot.

Toward the end of the run, no more additions of iron chloride are made, and the electrolysis is preferably continued until the bath is substantially completely exhausted of iron chloride, as indicated by a drop in the cell voltage. The end point may also be detected by a change of the bath from the characteristic yellowish brown color of the ferrous chloride to the colorless and crystal clear condition of the original alkali metal chloride bath. The current is then interrupted, and the metallic iron deposit is recovered as previously described.

The bath may be observed during a run through an opening 24 in the pot cover 25 by sliding aside the refractory plate 26. This opening is also used to add alkali metal chloride from time to time if required to maintain the bath level at the desired point.

The purity of the iron powder produced in this manner is easily kept above 99%, and the yield is substantially 100%. The metal has a high market value, being suitable for many uses in the metallurgical arts.

If the system described is first placed in operation using chlorine as the chloridizing gas, the major proportion of the chlorine is recovered again from the electrolytic cell 7 as HCl, in admixture with excess hydrogen introduced into the cell. The amount of this excess hydrogen may be balanced stoichiometrically against the chlorine lost from the condenser 4 so that, when this hydrogen is reacted with an equivalent amount of chlorine from the source 22, the total amount of HCl thus made available to the reactor 1 is sufficient to continue the system in operation with HCl serving as the chloridizing agent instead of chlorine. This balance may be maintained so that straight HCl continues thereafter to be available for the chloridizing reaction, and no initial source of dry HCl is necessary.

Alternatively, the initial source 23 of HCl may be used to place the system in operation, and the source 22 of chlorine may be used only to produce the make-up HCl required as the process continues.

Still another procedural variant is to start the system in operation by supplying hydrogen and chlorine from the sources 16 and 22 to the reactor 2 in reactive proportions to produce the preferred dry HCl chloridizing agent. In any case where chlorine and hydrogen are to be combined in substantial amounts for use in the reactor, they are preferably mixed and reacted at the point of introduction in the reactor by means of a gas burner type of mixing nozzle diagrammatically illustrated at 27. This eliminates any danger of an explosion due to the exothermic reaction between the two gases. It also is a convenient way in which to make use of the heat of reaction to assist in maintaining the temperature of the reactor 2.

From the foregoing general description of the essential elements of a physical system for carrying out the invention and the more detailed description of the preferred modes of operation, it will be appreciated that various elements of the physical system may be constructed in many different ways. It will also be appreciated from the description of the preferred modes of operation of the system that these, too, may be varied considerably in detail, while still employing the basic principles on which the invention is based. Accordingly, it is not intended that the invention be limited to the particular details disclosed except as required by the true spirit and scope of the appended claims.

Having described my invention, I claim:

1. A process for producing substantially iron-free titanium dioxide concentrates from mineral material containing titanium and iron, at least the titanium content being in the form of oxide, as $TiO_2$, comprising contacting the mineral material with a stream of anhydrous chloridizing gas at a temperature in the range of about 600° to 1000° C. in the substantial absence of air until substantially all iron in said mineral material has been converted to an iron chloride sublimate, removing the sublimate to leave a substantially iron-free titanium oxide concentrate, condensing the sublimate under anhydrous conditions to produce substantially anhydrous iron chloride, electrolyzing the iron chloride in a fused bath vehicle consisting essentially of alkali metal chloride, in the presence of hydrogen gas diffused through the bath, to deposit iron powder and release chlorine for reaction with said hydrogen to form anhydrous hydrogen chloride, and withdrawing the hydrogen chloride so formed and using it to chloridize more of said mineral material.

2. The process of claim 1 in which said anhydrous chloridizing gas at the beginning of the process consists essentially of chlorine, an anhydrous hydrogen chloride withdrawn from said electrolytic cell is substituted for said chlorine as the anhydrous hydrogen chloride is produced in the process.

3. The process of claim 1 in which said anhydrous chloridizing gas at the beginning of the process consists essentially of chlorine, additional anhydrous chlorine is mixed with excess hydrogen from said electrolytic cell to produce additional anhydrous hydrogen chloride, and the anhydrous hydrogen chloride withdrawn from said electrolytic cell and that produced with said additional anhydrous chlorine and excess hydrogen are substituted for chlorine in the chloridization of more of said mineral material as hydrogen chloride is so produced in the process.

4. A process for producing substantially iron-free titanium dioxide concentrates from mineral material containing titanium and iron, at least the titanium content being in the form of oxide, as $TiO_2$, comprising contacting the mineral material with a gaseous stream consisting essentially of anhydrous hydrogen chloride at a temperature in the range of about 775° to 1000° C. in the substantial absence of air until substantially all iron in said mineral material has been converted to a ferrous chloride sublimate, removing the sublimate to leave a substantially iron-free titanium oxide concentrate, condensing the sublimate under anhydrous conditions to produce substantially anhydrous ferrous chloride, electrolyzing the ferrous chloride in a fused bath vehicle consisting essentially of alkali metal chloride, in the presence of hydrogen gas diffused through the bath, to deposit iron powder and release chlorine for reaction with said hydrogen to form anhydrous hydrogen chloride, and withdrawing the hydrogen chloride so formed and using it to chloridize more of said mineral material.

5. A process for producing substantially iron-free titanium dioxide concentrates from mineral material containing titanium and iron, at least the titanium content being in the form of oxide, as $TiO_2$, comprising contacting the mineral material in a reaction chamber with a stream of anhydrous chloridizing gas at a temperature in the range of about 600° to 1000° C. in the substantial absence of air until substantially all iron in said mineral material has been converted to an iron chloride sublimate, removing the sublimate to leave a substantially iron-free titanium oxide concentrate, condensing the sublimate under anhydrous conditions to produce substantially anhydrous iron chloride, electrolyzing the iron chloride in a fused bath vehicle consisting essentially of alkali metal chloride, in the presence of hydrogen gas diffused through the bath, to deposit iron powder and release chlorine in the bath while diffusing hydrogen through the bath at a rate in excess of that required to convert all of said released chlorine to hydrogen chloride, withdrawing hydrogen chloride formed in said bath together with the excess hydrogen, and introducing them into said reaction chamber together with additional chlorine for chloridizing more of said mineral material, the amount of said additional chlorine being substantially the amount required to react with said excess hydrogen in said reaction chamber to form additional hydrogen chloride therein.

6. A process for producing substantially iron-free titanium oxide concentrates from mineral material containing titanium and iron, at least the titanium content being in the form of oxide, comprising contacting the mineral material in a reaction chamber with a gaseous stream consisting essentially of anhydrous hydrogen chloride at a temperature in the range of about 775° to 1000° C. in the substantial absence of air until substantially all iron in said mineral material has been converted to a ferrous chloride sublimate, removing the sublimate to leave a substantially iron-free titanium oxide concentrate, condensing the sublimate under anhydrous conditions to produce substantially anhydrous ferrous chloride, electrolyzing the ferrous chloride in a fused bath vehicle consisting essentially of alkali metal chloride to deposit iron powder and release chlorine in the bath while diffusing hydrogen through the bath at a rate in excess of that required to convert all of said released chlorine to hydrogen chloride, withdrawing hydrogen chloride formed in said bath together with the excess hydrogen, and introducing them into said reaction chamber together with additional chlorine for chloridizing more of said mineral material, the amount of said additional chlorine being substantially the amount required to react with said excess hydrogen in said reaction chamber to form additional hydrogen chloride therein.

References Cited in the file of this patent

UNITED STATES PATENTS

| | | |
|---|---|---|
| 1,805,567 | Cooper | May 19, 1931 |
| 1,845,342 | Saklatwalla | Feb. 16, 1932 |
| 2,030,867 | Hart | Feb. 18, 1936 |
| 2,120,602 | Donaldson | June 14, 1938 |
| 2,184,887 | Muskat et al. | Dec. 26, 1939 |
| 2,413,411 | Kroll | Dec. 31, 1946 |

FOREIGN PATENTS

| | | |
|---|---|---|
| 709,742 | Germany | Aug. 26, 1941 |

OTHER REFERENCES

Mellor: "Comprehensive Treatise on Inorganic Chemistry," vol. 14 (1935), pp. 10.